Sept. 28, 1965
C. E. BARTON
3,208,434
STOCK DIPPING VEHICLE
Filed Feb. 19, 1964
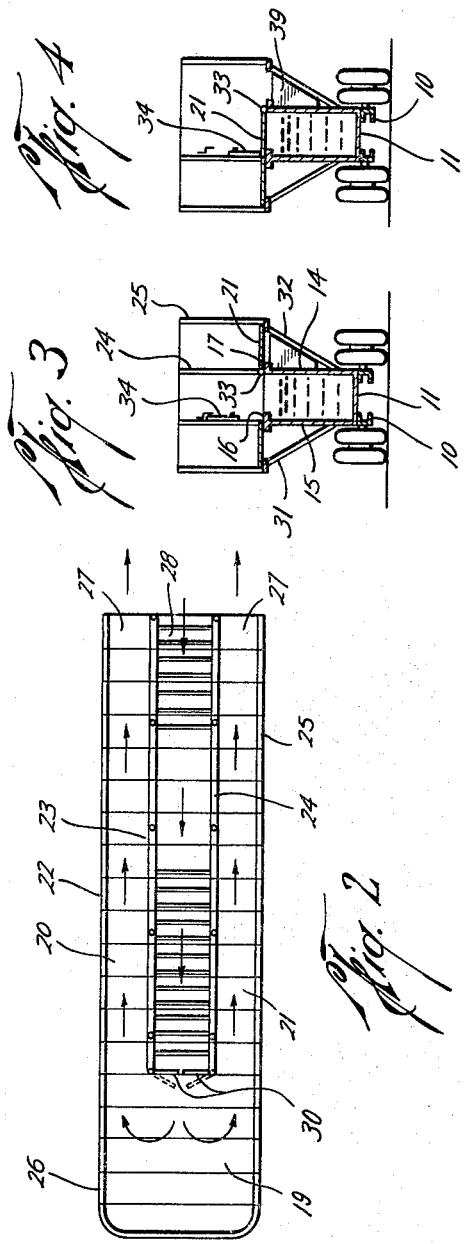
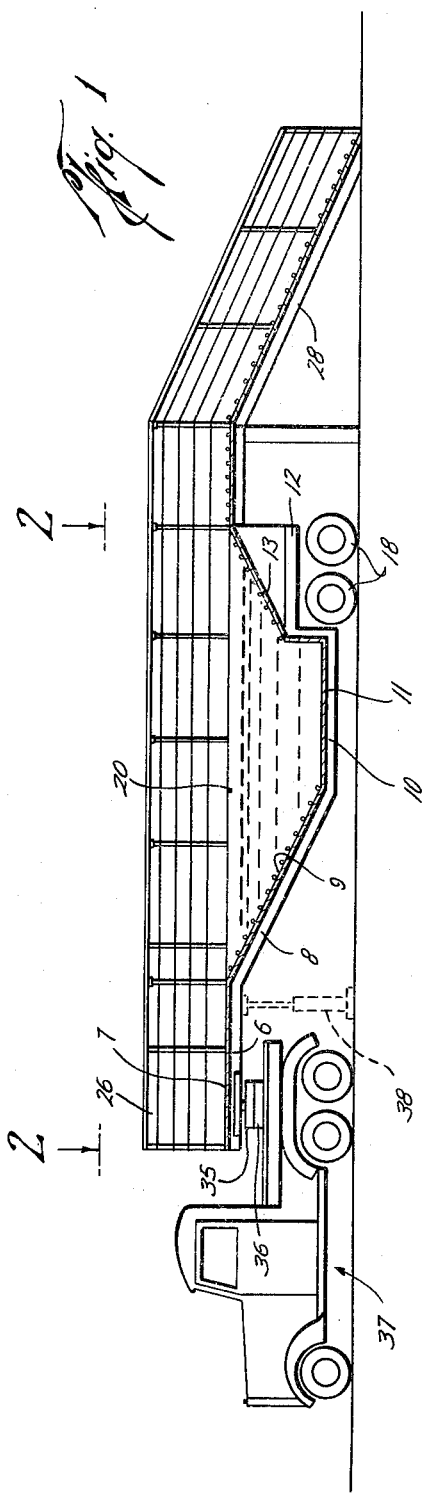
Curtis E. Barton
INVENTOR.
BY Bertram H. Mann
ATTORNEY

United States Patent Office 3,208,434
Patented Sept. 28, 1965

3,208,434
STOCK DIPPING VEHICLE
Curtis E. Barton, Rte. 1, Box 227, Dayton, Tex.
Filed Feb. 19, 1964, Ser. No. 346,590
2 Claims. (Cl. 119—158)

This invention relates to stock dipping tanks in which stock may be immersed for killing pests to which the animals may be subjected.

Heretofore, stock dipping tanks have been permanent installations erected in or on the ground so that cattle must be transported to them for treatment. While portable stock dipping vats have been suggested, these have not been particularly successful or practical due to their excessive width, limiting highway use, and inefficient means for collecting and returning to the tank solvent which drips from the cattle.

Accordingly, an object of the present invention is to provide a novel, portable stock dipping tank.

Another object is to provide a stock dipping tank incorporated in or mounted on a semi-trailer and having novel means for reducing the width of the vehicle during over-the-road travel.

Another object is to provide a portable stock dipping vat having runways for cattle emerging from the bath in position to return solvent drained from the cattle to the bath.

Another object is to provide a stock dipping vehicle having runways which may be hinged or folded into position to seal the tank against loss of liquid during over-the-road travel.

Another object is to provide a stock dipping vehicle having peripheral runways for cattle emerging from the bath, the front runway serving for mounting the pivotal support or fifth wheel for attachment to a tractor.

These objects and others hereafter appearing are attained in my novel portable stock dipping tank or vat which comprises, in general, a tank mounted on a semi-trailer and having a rear incline for admitting stock into the tank and a forward incline for directing the stock out of the tank to a runway which extends around the front and sides of the tank. The cattle enter the rear end of the tank through a suitable upwardly inclined loading chute, swim through the tank, emerge onto the forward runway, which also mounts the fifth wheel, then return along the side runways to unloading chutes at the back of the vehicle on each side of the loading chute. Solvent dripping from the cattle onto the runways flows directly back into the tank in a convenient and economical manner. One or more of the runways may be hinged so as to lie across the tank for preventing the loss of solvent during over-the-road travel.

In the accompanying drawings which illustrate the invention, FIG. 1 is a side view and vertical longitudinal section illustrating the novel tank vehicle attached to a tractor and with runways in stock accommodating position.

FIG. 2 is a top view showing the semi-trailer and ramp portions of the equipment.

FIG. 3 is a vertical transverse section through the tank vehicle.

FIG. 4 is a view similar to FIG. 3, but showing one of the runways swung across the top of the tank.

The novel tank vehicle comprises a rugged, structurally continuous underframe including horizontal, front portions 6 supporting a platform 7, foreward, inclined portions 8 supporting exit ramp 9, central portions 10 supporting floor 11, and rear horizontal portions 12, above which extends the entrance ramp 13 forming the rear end of the tank. FIG. 3 shows the tank bottom wall 11 and side walls 14 and 17 connecting bottom framing portions 10 and upper longitudinal beams 16 and 17 extending the length of the tank. Rear framing portions 12 are recessed upwardly to accommodate the running gear symbolized by tired wheels 18 and suitable springing, suspension, and brake elements which are conventional and therefore omitted from the views.

Walkways 20 and 21 extend from forward platform 7 along the side edges of the tank to the rear end thereof. Suitable preferably removable fencing elements are provided along both sides of the runways, as at 22, 23, 24, and around front platform 7, as at 26. The rear ends of runways 20 and 21 are left open for registry with exit ramps 27 which may parallel the inlet ramp shown at 28.

At the forward end of exit ramp 9 are provided a pair of doors 30, preferably opening outwardly only, for admitting cattle to the walkways which, preferably, incline slightly toward the tank for returning solvent thereto. Diagonal supports are provided, as at 31 and 32, for side walkways. Right hand walkway 21 (FIGS. 3 and 4) is hinged as at 33 to upper longitudinal beam 17 so that when inner fencing 24 is removed this walkway portion can be swung over to traverse the top of the tank for sealing the same to prevent loss of solvent during over-the-road transportation. In some cases, it may be desirable to have both walkways fold inwardly in this manner, either to meet at the center to form the tank roof, or to stack one upon the other. This has the advantage of substantially reducing the width of the vehicle for over-the-road travel, the braces 31 and 32, preferably, being removed or swung inwardly to lie against tank sidewalls 12 and 13. Suitable latching structure is provided for the walkway 21 when in tank sealing position, as the cleat 34 pivoted on to a suitable stanchion or post projecting above upper tank beam 16. Such latch structure, of course, should remain in position, even though the walkway fencing may be removed for over-the-road travel.

Mounted beneath forward underframe structure 6, which also supports part of the walkway around the tank, is the fifth wheel structure 35 which registers with and rests upon the usual coupling and pivoting plane structure 36 provided at the rear of a tractor, generally designated 37.

When the vehicle is backed against loading and unloading chutes, as in FIG. 1, the forward end thereof may be supported on the usual pivoted wheels, or jacks, as symbolized at 38.

FIGS. 3 and 4 also show a tank 39 mounted along one side of the vat and carrying an extra supply of dipping solvent.

In use, the novel tank vehicle will be transported, preferably in the sealed condition of FIG. 4, to a point of service where the open rear ends of inlet ramp 13 and exit walkways 20 and 21 will be brought in register with suitable inlets and discharge ramps, as 28 and 27, which latter may be merely tilted against the rear end of the tank or may be permanent installations against which the vehicle is rolled. If desired, the front end of the tank may be separately supported, as suggested at 38 and the tractor driven away for other use. With all of the fencing in place and the vat filled with proper treating liquid, cattle will be directed up the loading ramp 28, then down rear inclined ramp 13 where they will be forced to jump into the liquid due to the step-off between underframe portions 12 and 11. The cattle will then swim to the front end of the tank and walk out along forward ramp 9. Emerging through one-way pivoted gates 30, the cattle will pass upon forward platform 19, then move either rightwardly or leftwardly and exit along walkways 20 and 21. During the entire period that the cattle are on the walkways, liquid dripping from them will be collected by the walkways and returned to the tank. Ultimately, the cattle will pass the full length of side walkways 20 and 21 and will return to the ground or other loading facilities through exit ramps 27. After completion of a job, it is a relatively simple matter to equip the vehicle for road travel, by pivoting one of the walkways into tank sealing position, to couple the tractor to the front end pivotal support, to remove the temporary front end support structure 36, and to drive away to next servicing point. Accordingly, the vehicle has great versatility and very much reduces the cost of dipping stock to eradicate pests to which they are subjected. If desired, a separately covered structure may be provided for the vat for over-the-road travel and the side walkways may be simply dropped down to the sides of the tank or removed entirely. Obviously, the forward walkway portion is ruggedly built and in effect forms a continuation of the underframing for carrying drawing forces thereto. The invention may be modified in these and other respects as will occur to those skilled in the art, and exclusive use of all modifications as come within the scope of the appended claims is contemplated.

I claim:

1. Mobile stock dipping equipment comprising a wheeled semitrailer, a dipping vat mounted thereon, fenced walkway forming means projecting outwardly from the front and side edges of said vat, at least a portion of said walkway means being hingedly secured to the side edge of said vat and being swingable from its laterally-extended, walkway-forming position to a position of reduced lateral extension and covering said vat to resist loss of fluid therefrom during transportation, an entry ramp at the rear of said vat, an exit ramp at the front of said vat positioned to direct stock emerging from said vat onto said walkway means and thence around the sides of said vat to the rear thereof, one-way gate means between said exit ramp and said walkway means, and a tractor attachment of the fifth wheel type on the undersurface of the front part of said walkway means.

2. Completely mobile stock dipping equipment comprising a wheeled semitrailer vehicle, a dipping vat mounted thereon, continuous front and side animal walkway means secured to said vat and projecting outwardly from the front and side edges thereof and inclined toward said vat for returning animal drippings thereto, an entry ramp at the rear end of said vat, an exit ramp at the front end of said vat positioned to direct stock emerging from said vat onto said front walkway means whereby the stock may exit along either of said side walkway means to the rear of said vehicle, and a tractor attachment of the fifth wheel type on the under part of said front walkway means.

References Cited by the Examiner
UNITED STATES PATENTS

| | | | |
|---|---|---|---|
| 821,809 | 5/06 | Kramer | 119—158 |
| 876,631 | 1/08 | Goff | 119—156 |
| 1,493,411 | 5/24 | Womack | 117—156 |
| 2,216,328 | 10/40 | Spangler | 119—158 |

SAMUEL KOREN, *Primary Examiner.*

HUGH R. CHAMBLEE, ALDRICH F. MEDBERY,
*Examiners.*